United States Patent
Paroth et al.

(10) Patent No.: US 8,919,536 B2
(45) Date of Patent: Dec. 30, 2014

(54) CONVEYING DEVICE FOR CONVEYING CONTAINERS

(75) Inventors: Berthold Paroth, Dortmund (DE); Martin Backhaus, Unna (DE); Christian Schmitz, Hattingen (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/883,184

(22) PCT Filed: Oct. 12, 2011

(86) PCT No.: PCT/EP2011/005097
§ 371 (c)(1),
(2), (4) Date: May 2, 2013

(87) PCT Pub. No.: WO2012/059167
PCT Pub. Date: May 10, 2012

(65) Prior Publication Data
US 2013/0228418 A1    Sep. 5, 2013

(30) Foreign Application Priority Data
Nov. 3, 2010  (DE) .......................... 10 2010 050 129

(51) Int. Cl.
| B65G 15/12 | (2006.01) |
| B65G 47/66 | (2006.01) |
| B65G 15/50 | (2006.01) |
| B65G 17/40 | (2006.01) |

(52) U.S. Cl.
CPC ........ *B65G 15/12* (2013.01); *B65G 2201/0244* (2013.01); *B65G 15/50* (2013.01); *B65G 17/40* (2013.01); *B65G 47/66* (2013.01)
USPC ............................ 198/604; 198/606; 198/817

(58) Field of Classification Search
CPC ........ B65G 15/12; B65G 15/24; B65G 47/66; B65G 2201/0244
USPC ......................................... 198/604, 606, 817
See application file for complete search history.

(56) References Cited

U.S. PATENT DOCUMENTS

| 3,665,863 A | * | 5/1972 | Patin ............................. 198/321 |
| 4,844,234 A | | 7/1989 | Born |
| 4,974,721 A | * | 12/1990 | Born ............................. 198/434 |

(Continued)

FOREIGN PATENT DOCUMENTS

| DE | 86 05 952 | 5/1986 |
| DE | 38 23 228 A1 | 1/1990 |

(Continued)

*Primary Examiner* — Mark A Deuble
(74) *Attorney, Agent, or Firm* — Occhiuti & Rohlicek LLP

(57) ABSTRACT

A conveying device for conveying containers in a conveying direction, the containers having bottoms, each of which has a cross-section characterized by a standing-bottom diameter or a smaller and larger standing-bottom diameter. The device has conveyor belts extending along a conveying direction forming a closed loop. The conveyor belts form, with upper-loop lengths thereof, a sub-region of a conveying surface, the upper-loop lengths being disposed adjacent to each other in a rows offset in an axial direction. The containers stand on the upper-loop lengths on their bottoms. The conveyor belts have a width that, for containers having a circular cross-section, is smaller than half the standing-bottom diameter of the smallest container diameter to be conveyed, and, for containers having a non-circular cross-section, is smaller than half a smaller standing-bottom diameter of a smallest container diameter to be conveyed.

16 Claims, 8 Drawing Sheets

(56) References Cited

U.S. PATENT DOCUMENTS

| | | | |
|---|---|---|---|
| 5,168,978 A * | 12/1992 | Cox et al. | 198/369.5 |
| 6,199,679 B1 * | 3/2001 | Heuft | 198/415 |
| 7,090,067 B2 * | 8/2006 | Schiesser et al. | 198/395 |
| 7,588,139 B1 * | 9/2009 | Campbell, III | 198/817 |
| 7,909,159 B1 * | 3/2011 | Zats et al. | 198/586 |
| 2002/0043450 A1 * | 4/2002 | Ohlmann et al. | 198/817 |
| 2002/0056610 A1 * | 5/2002 | Seggern | 198/817 |
| 2006/0260914 A1 * | 11/2006 | Krause et al. | 198/817 |

FOREIGN PATENT DOCUMENTS

| | | | | |
|---|---|---|---|---|
| DE | 296 00 902 U1 | 5/1997 | | |
| DE | 10 2005 063 193 A1 | 7/2007 | | |
| DE | 603 20 572 T2 | 6/2009 | | |
| EP | 1380522 A1 * | 1/2004 | | B65G 47/51 |
| JP | 2005 262101 | 9/2005 | | |

* cited by examiner

CONVEYING DEVICE FOR CONVEYING CONTAINERS

CROSS REFERENCE TO RELATED APPLICATION

This application is the national phase under 35 USC 371 of international application no. PCT/EP2011/005097, field Oct. 12, 2011, which claims the benefit of the priority date of German application no. 10 2010 050 129.8 filed Nov. 3, 2010. The contents of the aforementioned applications are incorporated herein in their entirety.

FIELD OF DISCLOSUER

The invention relates to a conveying device or to a conveyor for conveying containers.

BACKGROUND

In the context of the invention, "containers" are in particular cans, bottles, tubes and pouches made from metal, glass and/or plastic, but also other packaging means which are suitable for example for filling with liquid or viscous products.

Conveying devices or conveyors for conveying containers, comprising a plurality of conveyor belts which are driven in rotation and each form a closed loop, particularly also in the form of conveyor chains or slat-band chains, are known. The conveyor belts each form with their upper length, which is supported against at least one sliding guide, the common horizontal or substantially horizontal conveying plane or conveying surface on which the containers stand with their container bottom or their standing bottom.

It is also known that the conveyor belts cannot be embodied in just any length since, if the length were too great, the friction forces occurring between the respective conveyor belt and the sliding guide would exceed the maximum tensile strength of the conveyor belts, particularly also during constant operation of the conveying device. For this reason it is customary, particularly in the case of conveyors of relatively great length, to provide a plurality of conveyor belts adjoining one another in the conveying direction, which then also results in the possibility of improved control and/or regulation of the power and/or conveying speed of the conveyor belts, for example due to a separate drive for each conveyor belt or for a group of conveyor belts. However, conveyors of this type then inevitably have transitions between the conveyor belts adjoining one another in the conveying direction. The gaps formed at these transitions are usually bridged on the conveying surface by transfer elements or container sliding elements, for example in the form of sliding plates. Nevertheless, these transitions are a disturbance on the conveying surface, i.e. the containers stand only incompletely on the upper lengths of the conveyor belts when passing such transitions, namely inter alia with the disadvantage that, when a conveyor or a system comprising said conveyor is being cleared, for example in the event of a product changeover, i.e. when changing the system from containers of one type to containers of a different type and/or from a product of one type to a product of a different type, the containers remain on the transfer elements or container sliding elements and manual interventions are required in order to remove these containers.

If the transfer elements or sliding elements are omitted, there is an increased risk of undesirable disruptions to the production process, particularly due to containers falling over.

SUMMARY

The problem addressed by the invention is that of providing a conveying device or a conveyor for containers which avoids the aforementioned disadvantages.

In the context of the invention, container bottom or standing bottom is to be understood to mean that bottom region with which the respective container stands on the conveying surface of the conveyor and which is critical to the standing stability of the container. For example, in the case of containers having a flat bottom, said flat bottom is the standing bottom. In the case of containers having a concave bottom or a bottom which is concave in the broadest sense or a bottom which has protrusions and depressions located therebetween, as is customary in many cases particularly on plastic containers or PET bottles, the container region which protrudes downwards beyond the rest of the container bottom and which is ring-shaped for example, or else the bottom regions protruding downwards beyond the rest of the bottom, form the standing bottom with which the respective container stands on the conveying surface.

In the context of the invention, "standing-bottom diameter" is to be understood to mean that dimension on the container bottom which is of particular importance for the standing behaviour of the respective container on the conveying surface.

Accordingly, in the case of containers having a round container cross-section, the standing-bottom diameter is usually the distance between two regions of the standing bottom located furthest away from each other.

In the case of containers which have an oval, rectangular or irregularly shaped container cross-section and which are shaped according to this container cross-section even in the region of their standing bottom, in the context of the invention the smaller standing-bottom diameter is the distance which two standing-bottom regions in the smaller cross-sectional axis of the container cross-section have from each other, and the larger standing-bottom diameter is the distance which two standing-bottom regions in the larger cross-sectional axis of the container cross-section have from each other.

In the context of the invention, the expression "substantially" means deviations from the exact value by +/−10%, preferably by +/−5%, and/or deviations in the form of changes which have no effect on the function.

According to one aspect of the invention, the width which the conveyor belts of the conveying device exhibit in the axial direction perpendicular to the conveying direction thereof, at least in one sub-region of the conveying device, is smaller than half the standing-bottom diameter or, in the case of a container cross-section differing from the circular shape, is smaller than half the smaller standing-bottom diameter of in each case the containers to be conveyed by the conveying device which have the smallest container diameter or the smallest standing-bottom diameter.

According to a further aspect of the invention, the transitions which are formed in each case between two conveyor belts succeeding one another in the conveying direction are offset from each other on the conveying surface in such a way that the distance between in each case two such transitions in the conveying direction and/or in the axial direction perpendicular to the conveying direction is at least equal to half the standing-bottom diameter or, in the case of a container cross-section differing from the circular shape, is greater than half the larger standing-bottom diameter of in each case the containers to be conveyed by the conveying device which have the largest container diameter or the largest standing-bottom diameter.

The invention is based inter alia on the realisation that, simply due to this width of the conveyor belts which is selected in relation to the standing-bottom diameter and/or due to this spacing of the transitions, the conveying of the containers on the conveying surface can be improved, in particular disruptions in the production process can even be avoided, particularly also as a result of the fact that the containers during the conveying process constantly stand in each case at least with half the standing-bottom diameter on at least one of the conveyor belts, which are preferably once again conveyor chains or slat-band chains.

According to a further aspect of the invention, in a conveying device for conveying containers, at least in a sub-region of the conveying device the conveying surface thereof is formed by conveyor belts of different width which are offset from each other in the axial direction perpendicular to the conveying direction and of which then at least one conveyor belt of a first type exhibits a first width which is smaller than half the standing-bottom diameter or—in the case of a container cross-section differing from the circular shape—is smaller than half the smaller standing-bottom diameter of in each case the containers to be conveyed by the conveying device which have the smallest container diameter or the smallest standing-bottom diameter. The invention is based inter alia on the realisation that, due to the narrower conveyor belts of the first type and due to the larger width of the conveyor belts of the at least one further type, a reduction in the total number of conveyor belts required for a predefined total width of the conveying device and a considerable reduction in the design complexity and manufacturing costs can be avoided, namely while ensuring secure conveying even of those containers which have the smallest container diameter or the smallest standing-bottom diameter.

Further developments, advantages and possible uses of the invention will become apparent from the following description of examples of embodiments and from the figures. All the features described and/or shown in the figures, per se or in any combination, form in principle the subject matter of the invention, regardless of the way in which they are combined or refer back to one another in the claims. The content of the claims also forms part of the description.

BRIEF DESCRIPTION OF THE FIGURES

The invention will be explained in more detail below with reference to the figures and on the basis of examples of embodiments. In the figures.

DETAILED DESCRIPTION

Figure 1:
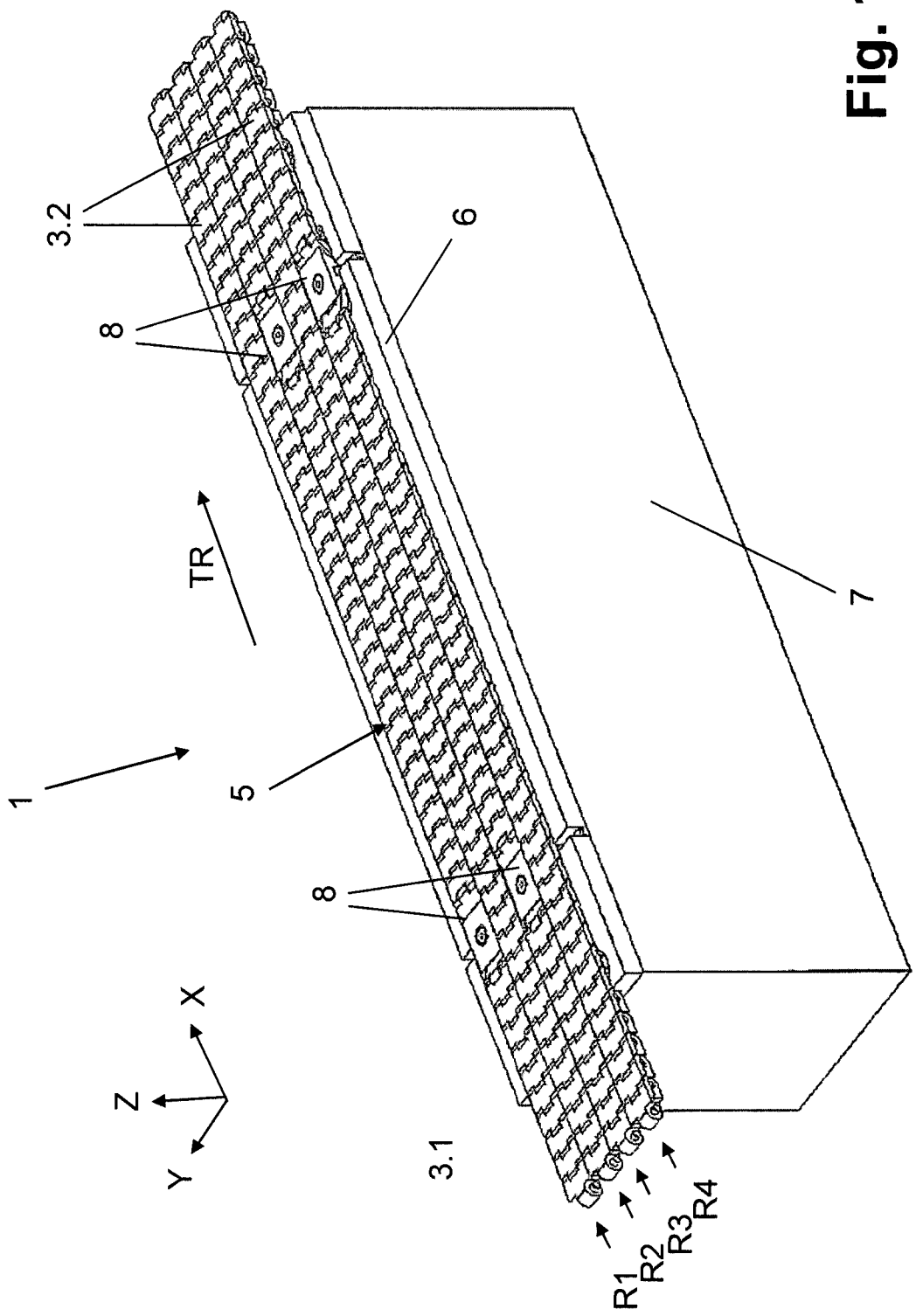
FIG. 1 shows, in a schematic perspective partial view, a conveying plane or conveying surface of a conveyor or conveying device for containers, for example for containers in the form of bottles, said conveying plane or conveying surface being formed by a plurality of conveyor belts (preferably conveyor chains or slat-band chains)
Figure 2:
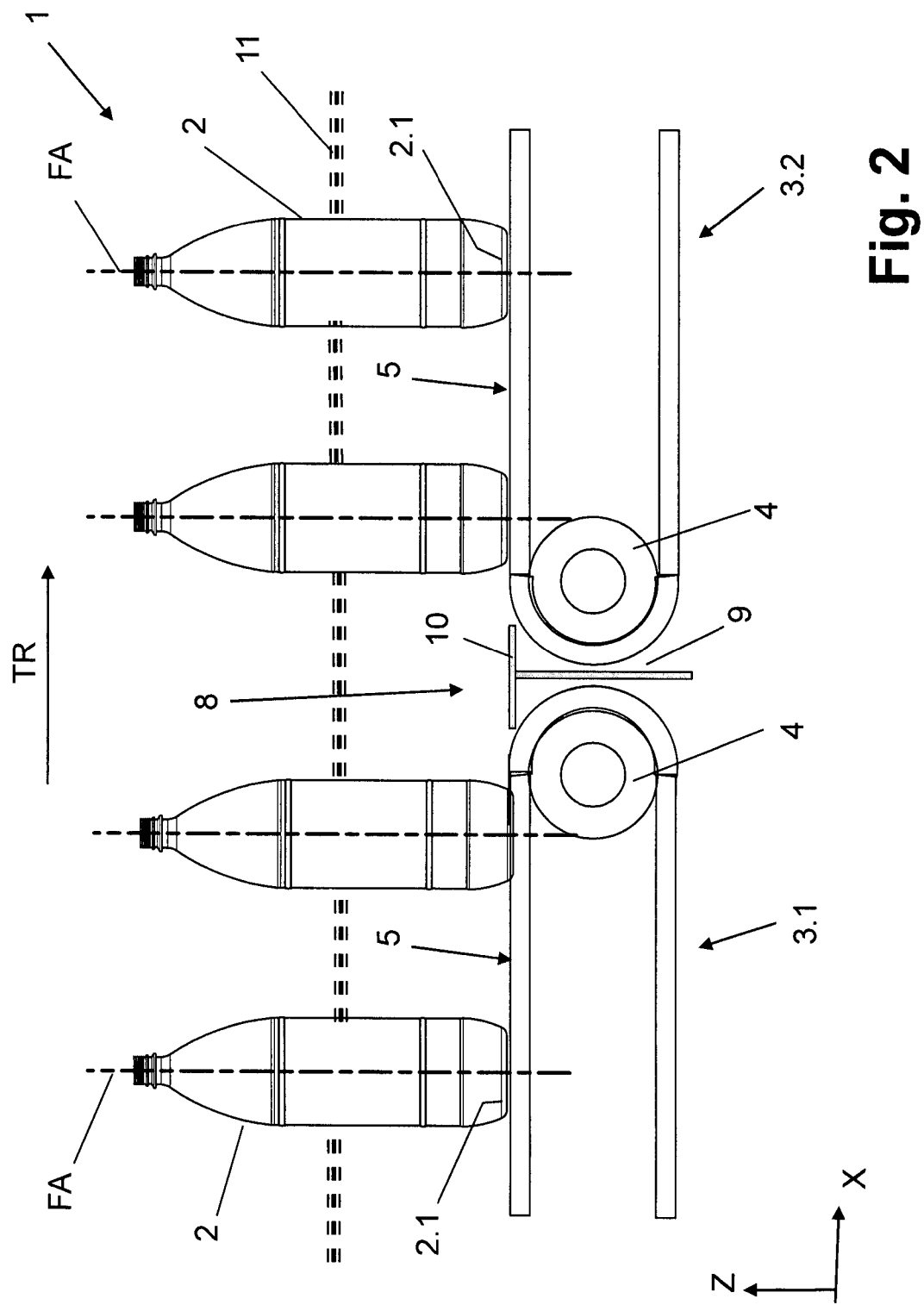
FIG. 2 shows, in a simplified schematic view, the transition between two conveyor belts succeeding one another or adjoining one another in a conveying direction TR, together with bottles arranged upright on the conveying surface of these conveyor belts.

For the sake of better understanding, there are shown in each of the figures three spatial axes oriented perpendicular to one another, namely the horizontal X axis, the horizontal Y axis and the vertical Z axis.

The conveying device, denoted generally by 1 in FIGS. 1-4, serves for conveying containers, for example in the form of bottles 2, in a conveying direction TR oriented in the X axis. The conveying device 1 comprises a plurality of conveyor belts 3.1 and 3.2 in the form of conveyor chains or slat-band chains, which each form a closed loop and to this end are guided at each end over a respective direction change element or over a direction change wheel or chain wheel 4 in such a way that the conveyor belts 3.1 and 3.2 form with their respective upper loop length a horizontal conveying surface 5, i.e. a conveying surface arranged in the XY plane, on which the bottles 2 oriented with their bottle axes FA in the direction of the Z axis stand with their standing bottom or bottle bottom 2.1. For conveying the bottles 2 on the conveying surface 5 in the conveying direction TR, the conveyor belts 3.1 and 3.2 are each driven via the second chain wheel 4 in the conveying direction TR. The conveyor belts 3.1 and 3.2 each rest in a sliding manner with the upper loop length on a sliding guide, which is generally denoted by 6 in the figures and is provided on a machine frame 7.

In particularly advantageous embodiments, there may also be provided on the machine frame 7 of the conveyor 1 a sliding guide for the respective lower loop length of the conveyor belts 3.1 and 3.2. However, no such sliding guide is shown in the figures.

As shown in particular in FIG. 1, the conveyor belts 3.1 and 3.2 are arranged at least with their upper loop lengths in a plurality of rows which are offset perpendicular to the conveying direction TR, i.e. in the Y axis, i.e. in the illustrated embodiment in four rows R1-R4, namely such that the upper loop lengths of adjacent conveyor belts 3.1 and 3.2 tightly adjoin each other in the Y axis. In order to reduce the power required to drive the conveyor belts 3.1 and 3.2, but in particular to avoid excessively great tensile forces within the conveyor belts 3.1 and 3.2 which (tensile forces) result mainly from the friction between the conveyor belts 3.1 and 3.2 and the sliding guide 6 and lead at least to excessively high wear on the conveyor belts 3.1 and 3.2, particularly including in the region of the articulated connections between the individual chain members of these conveyor belts, each conveyor belt 3.1 and 3.2 extends in each case only over a partial length of the total conveying path of the conveyor 1. In each row R1-R4, a conveyor belt 3.2 adjoins a conveyor belt 3.1 which precedes it in relation to the conveying direction TR, namely at a transition 8 which is formed by the chain wheels 4 adjacent to one another there and spaced apart from one another in the X axis. The chain wheels 4 are in each case mounted on the machine frame 7 so as to be rotatable about axes parallel to the Y axis.

Provided at each transition 8, in order to bridge the gap 9 formed there between the conveyor belts 3.1 and 3.2, is a container sliding element 10 which is for example a sliding plate and forms with its upper side the conveying surface in the region of the respective transition 8.

In addition to the conveyor belts 3.1 and 3.2 which form the conveying surface 5, the conveyor 1 furthermore at least also has lateral container guides 11 or guide rails which extend in the direction of the X axis.

Figure 3:
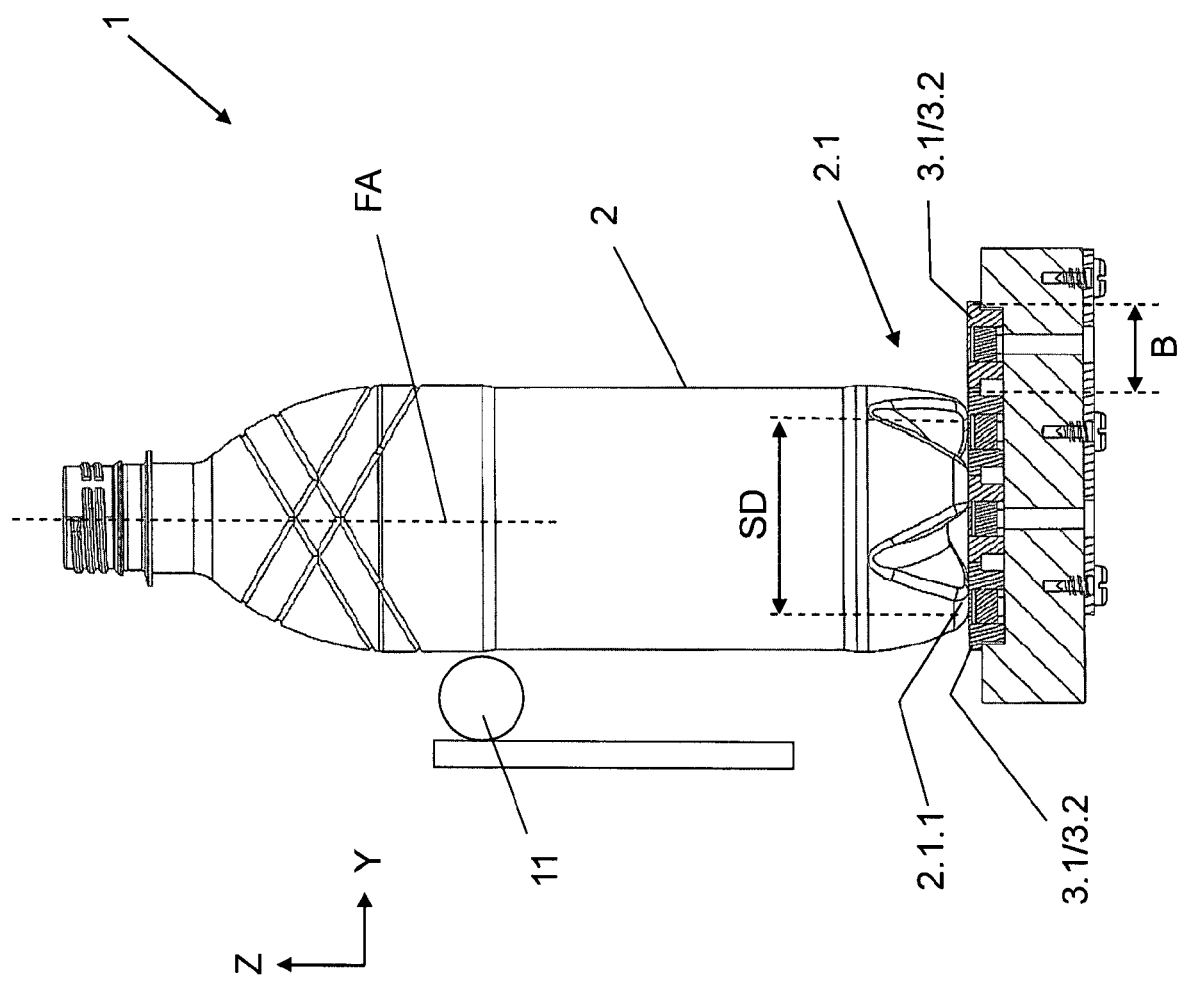
FIG. 3 shows, in a simplified schematic view, a section through the upper loop lengths of the conveyor belts and through the associated container guide, namely in a sectional plane perpendicular to the conveying direction TR, together with a bottle arranged on the conveying surface.

FIG. 3 shows a section through the upper loop lengths of the conveyor belts 3.1 and 3.2 in a cross-sectional plane perpendicular to the conveying direction TR, i.e. in a sectional plane corresponding to the YZ plane. As can be seen in FIG. 3, the conveyor belts 3.1 and 3.2 each have the same width B. As can also be seen in FIG. 3, in the illustrated embodiment the bottles 2 are formed with protrusions and, located therebetween, depressions on their standing bottom or bottle bottom 2 so that they each stand only with sub-regions 2.1.1 of the bottle bottom 2.1 on the conveying surface 5. In FIG. 3, SD denotes the standing-bottom diameter of the bottles 2, which in the case of the illustrated design of the bottles 2 is that distance on their bottle bottom 2.1 between two sub-regions 2.1.1 which are furthest away from one another and which each form a standing surface.

As also shown in FIG. 3, the width B which the conveyor belts 3.1 and 3.2 exhibit in the Y axis is a multiple smaller than the standing-bottom diameter SD, namely smaller than half the standing-bottom diameter SD of the smallest bottles 2 to be conveyed on the conveying device 1, i.e. of the bottles 2 having the smallest container diameter or bottle diameter. As a result, inter alia it is ensured that even the bottles 2 having the smallest container diameter or bottle diameter constantly stand during the conveying process with at least half the standing-bottom diameter SD, preferably with more than half the standing-bottom diameter SD, on conveyor belts 3.1 and/or 3.2, namely even at the transitions 8, so that reliable and trouble-free conveying of the bottles 2 is ensured.

The container diameter of customary containers or bottles 2, particularly those used in the beverage industry, lies in the range between approximately 40 mm and 125 mm. The width B of the conveyor belts 3.1 and 3.2 is thus at least 10 mm and at most 25 mm, preferably the width B is 15 mm, 20 mm or 25 mm depending on the container diameter or bottle diameter and/or depending on the standing-bottom diameter SD.

For the time being, a uniform standard has formed in the manufacture of conveying devices for bottles 2 or for other containers, according to which conveying devices are configured with a plurality of conveyor belts in a width grid of 85 mm, said conveyor belts adjoining each other and being offset from each other in the Y axis perpendicular to the conveying direction TR. Against this background, it is particularly advantageous to select the width B of the conveyor belts 3.1 and 3.2 in such a way that it fits into the width grid of 85 mm or into a different width grid that is usually used. In this context, the width B is preferably a whole-number fraction (fraction with a whole-number denominator) of the respective width grid, for example of the width grid of 85 mm. Depending on the standing-bottom diameter SD, this results in widths B of approximately 42.5 mm or 28.3 mm or 21.2 mm or 17.0 mm or 14.1 mm or 12.14 mm.

As shown in particular in FIG. 1, the transitions 8 are spaced apart from one another both in the direction of the X axis and in the Y axis, namely in the diagram shown in FIG. 1 as a result of the fact that the transitions 8 of adjacent rows R1-R4 are each offset in the conveying direction TR or in the direction of the X axis. Of course, an arrangement of the transitions 8 which differs from that shown in FIG. 1 is also possible. In any case, however, the transitions 8 are arranged in such a way that the transitions 8 of adjacent rows R1-R4 are offset in the direction of the X axis and/or each transition 8 has from each other transition 8, at least in the direction of the X axis, a distance which is at least equal to half the standing-bottom diameter SD of those bottles 2 to be conveyed by the conveying device 1 which have the larger standing-bottom diameter SD.

Preferably, however, the transitions 8 are offset from each other in a manner differing from what is shown in FIG. 1, in particular are offset from each other in the conveying direction TR, so that each bottle 2, when passing a transition 8 with its standing bottom or bottle bottom 2.1, always stands with at least half the standing-bottom diameter SD on adjacent conveyor belts 3.1 and 3.2, i.e. in each case less than half the standing-bottom diameter SD is located on the transition 8. To this end, perpendicular to the conveying direction TR as well, i.e. in the Y axis, the distance between all the transitions 8 is at least equal to half the standing-bottom diameter SD of those bottles 2 which are to be conveyed by the conveyor 1 and which have the largest standing-bottom diameter SD. Given a customary container diameter or bottle diameter in the range between 40 mm and 125 mm, the distance between the transitions 8, for example both in the direction of the X axis and in the Y axis, is then at least approximately 63 mm.

Figure 4:
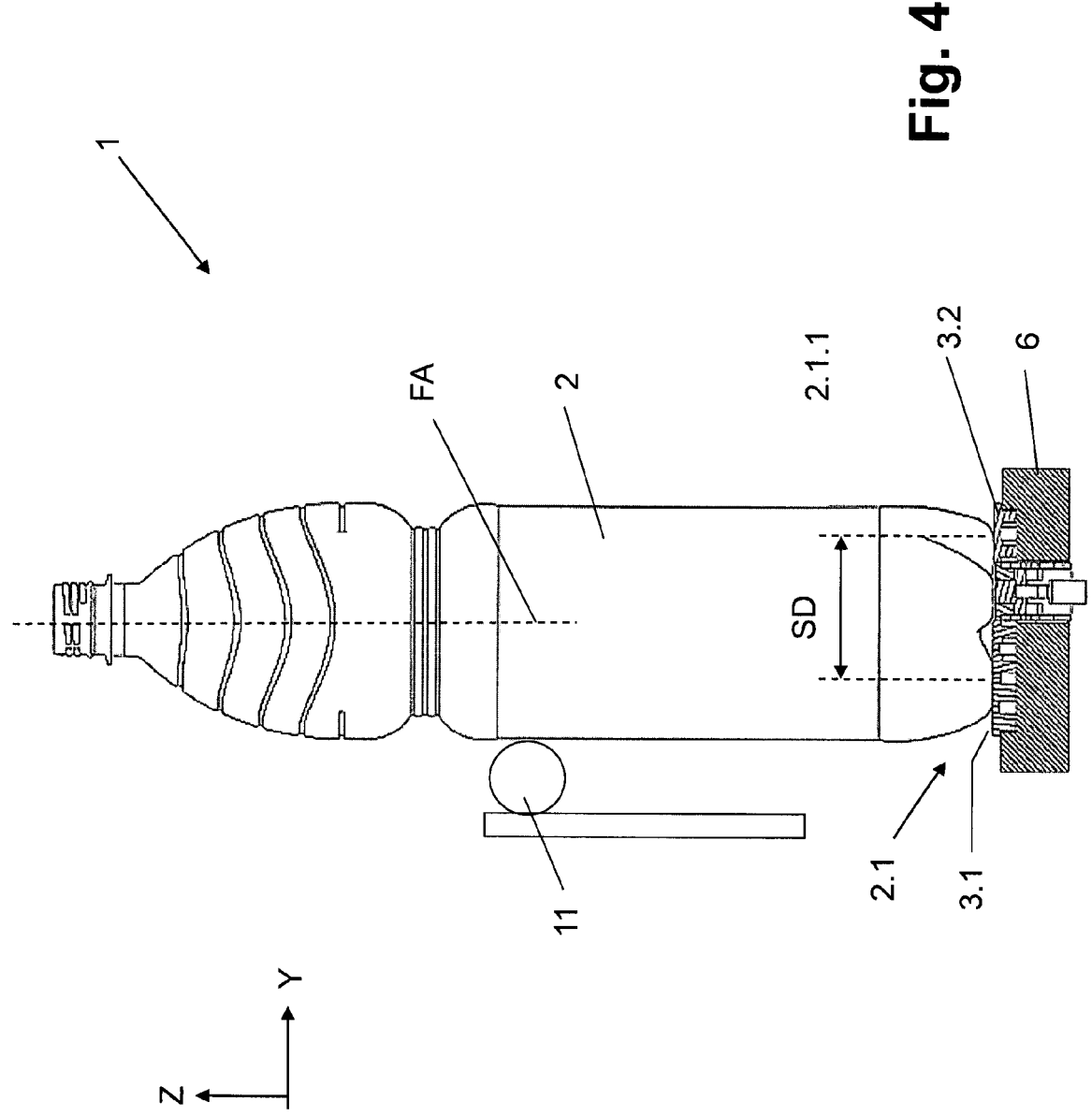
FIG. 4 shows a view similar to FIG. 3, but in the region of a transition or a direction change element of one of the conveyor belts.
Figure 5:
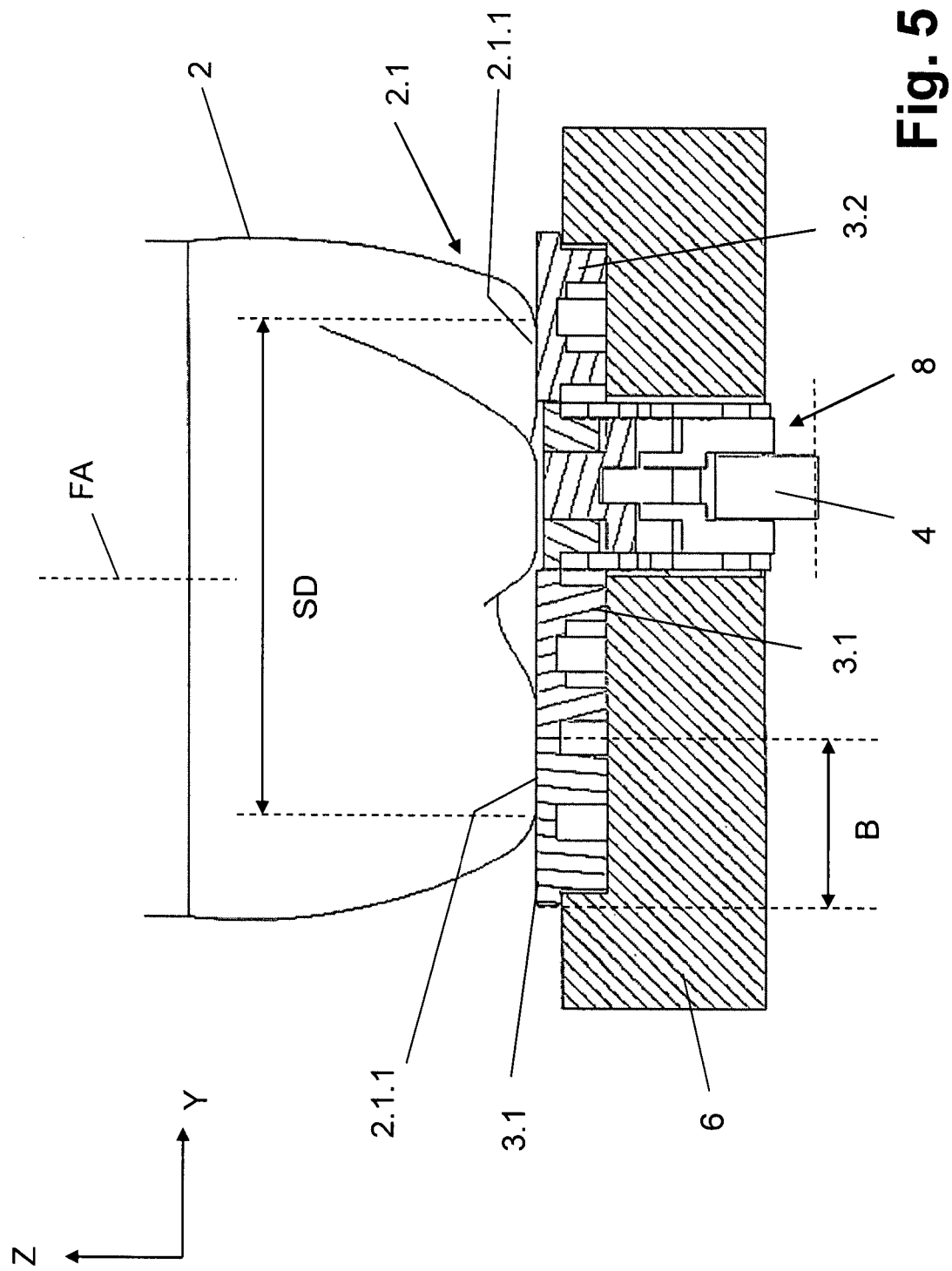
FIG. 5 shows an enlarged partial view of FIG. 4.

FIGS. 4 and 5 show a section through the upper lengths of the conveyor belts 3.1 and 3.2 as well as through the associated sliding guide 6 in a sectional plane perpendicular to the conveying direction TR in the region of a transition 8 and together with a bottle 2, namely in an embodiment in which all the transitions 8 are in each case offset from each other in the conveying direction TR in the manner described above, so that each bottle 2 with its bottle bottom 2.1 or with sub-regions 2.1.1 stands reliably and with more than 50%, i.e. with most of the bottle bottom 2.1 or of the bottom region 2.1.1, outside of the transition 8 on the adjacent conveyor belts 3.1 and 3.2. This situation is shown particularly clearly in FIG. 5.

To this end, perpendicular to the conveying direction TR as well or in the Y axis, adjacent transitions 8 are at a distance which is at least equal to half the standing-bottom diameter SD. Not only does this ensure trouble-free conveying of the bottles 2 at the transitions 8, but as a result it may even be possible to omit the container sliding elements 10 at the transitions 8.

The conveying device according to the invention offers inter alia the advantage of trouble-free conveying of the bottles 2 or other containers along the conveying path 1 formed by the conveyor belts 3.1 and 3.2, in particular including in the region of the transitions 8. The risk of tipping-over or falling-over of the bottles 2 or other containers is considerably reduced. The conveying device 1 or the conveying path formed by the latter can be fully cleared in the event of a product change, without manual intervention being necessary. This applies in particular even to the smallest bottles or containers to be conveyed by the conveying device 1.

The conveyor belts 3.1 and 3.2 are driven for example at the same conveying speed or at different conveying speeds, namely for example the conveyor belts 3.1 and 3.2 forming a container inlet and/or a container outlet of the conveying device 1 at different conveying speeds and/or at a conveying speed different from the conveying speed of other conveyor belts 3.1 and 3.2.

Figure 6:
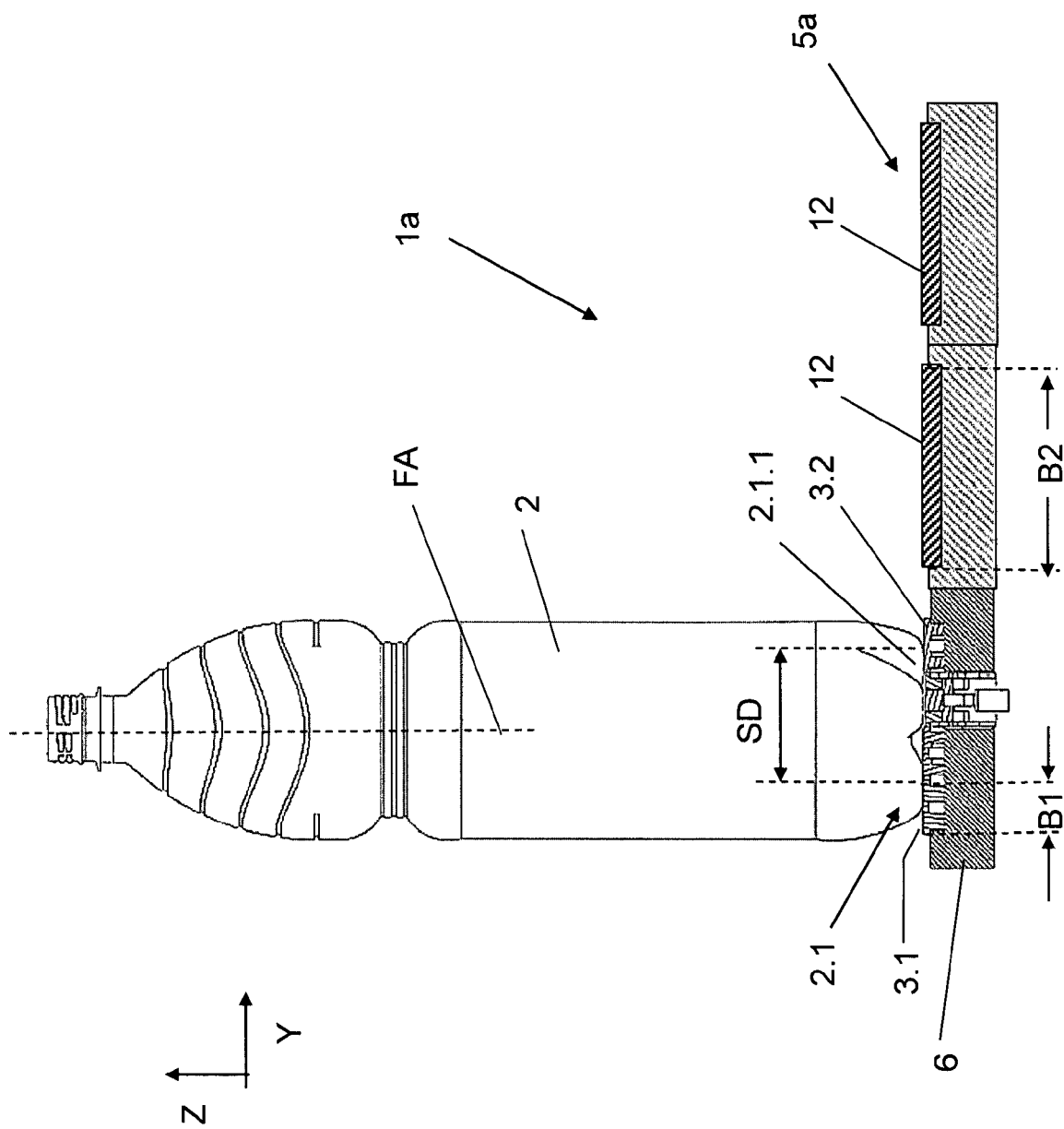
FIG. 6 shows, in a simplified partial view and in vertical section perpendicular to the conveying direction, a further embodiment of the conveyor according to the invention.

FIG. 6 shows in a partial view and in vertical section perpendicular to the conveying direction, i.e. in a view similar to FIG. 3, a conveyor 1a which differs from the conveyor 1 in that the conveying surface 5a is formed only partially by the narrower conveyor belts 3.1 and 3.2 (conveyor belts of the first type) having a width B1 which is for example equal to the width B of the conveyor belts 3.1/3.2 of the conveyor 1. The conveying surface 5a, which is horizontal or substantially horizontal, i.e. arranged in the XY plane, is also partially formed by conveyor belts 12 of a second type having a width B2 which is much larger than the width B1, i.e. in the illustrated embodiment having a width B2 which is a whole-number multiple of the width B1 and corresponds for example to three times or four times the width B1. The conveyor belts 3.1/3.2 and 12 are once again conveyor chains or slat-band chains and are arranged in such a way that they form the conveying surface 5a in a plurality of rows which are adjacent to each other in the direction of the Y axis, and moreover in each row in the conveying direction at least one conveyor belt 3.1 is adjoined by a further conveyor belt 3.2 and also at least one conveyor belt 12 is adjoined by a further conveyor belt 12, namely in each case at transitions (not shown) which correspond to the transitions 8. These transitions are once again preferably offset from each other in the conveying direction as well as perpendicular to the conveying direction, i.e. in the direction of the Y axis, in such a way that each transition has from each further transition a distance which is at least equal to half the standing-bottom diameter SD of those bottles 2 to be conveyed by the conveying device 1a which have the larger standing-bottom diameter SD.

The conveyor belts 12 of the second type having the larger second width B2 form for example at least one side region or a portion of at least one side region of the conveying surface 5a, i.e. in the direction of the Y axis the conveying surface 5a is formed for example at least by an outer group of conveyor belts 12 of the second type, then at least by a group of conveyor belts 3.1/3.2 of the first type and then, in the region of the opposite longitudinal side, once again at least by a group of conveyor belts 12 of the second type. At least with regard to the number and type of conveyor belts 3.1/3.2 and 12, the conveying surface 5a is then for example mirror-symmetrical relative to a central plane arranged in the XZ plane.

Although FIG. 6 shows only a total of three conveyor belts 3.1/3.2, the number of these conveyor belts may also differ from this, in particular may also be greater than three. Due to the conveyor belts 3.1/3.2, it is possible inter alia that, given a suitable adjustment of container guides which laterally delimit the conveying surface, for bottles 2 or for other containers having the smaller standing-bottom diameter SD only the conveyor belts 3.1/3.2 form the effective part of the conveying surface 5a. As a result, even bottles 2 or other containers having the smaller standing-bottom diameter SD are conveyed in a reliable and trouble-free manner in the conveying direction, in particular including at transitions between conveyor belts 3.1/3.2 adjoining each other in the conveying direction, especially since it is ensured that at the transitions each bottle 2 stands with a sufficiently large part of its standing-bottom diameter SD on at least one conveyor belt 3.1/3.2 adjacent to the respective transition. For bottles 2 or for other containers having a larger standing-bottom diameter SD, given a suitable adjustment of the container guides which laterally delimit the conveying surface, the effective part of the conveying surface 5a is formed both by the conveyor belts 3.1/3.2 and by the conveyor belts 12.

As stated, the width B1 of the conveyor belts 3.1/3.2 corresponds to the width B. Preferably, the width B1 in the case of the conveying device 1a is one-fifth of the standing-bottom diameter SD of the bottles 2 to be conveyed by the conveyor 1a which have the smallest standing-bottom diameter SD. Preferably, the width B2 in the case of the conveying device 1a is two-fifths of the standing-bottom diameter SD of the bottles 2 to be conveyed by the conveyor 1a which have the second-smallest standing-bottom diameter SD.

The use of the narrower conveyor belts 3.1, 3.2 having the smaller width B1 and of the conveyor belts 12 having the larger width B2 results in a substantial reduction in the total number of conveyor belts required and thus in a considerable reduction in manufacturing costs, in particular including the costs for assembly and for the conveyor belts, while at the same time ensuring a high level of operational reliability and the possibility of adapting the conveying device 1a to different standing-bottom diameters SD.

Figure 7:
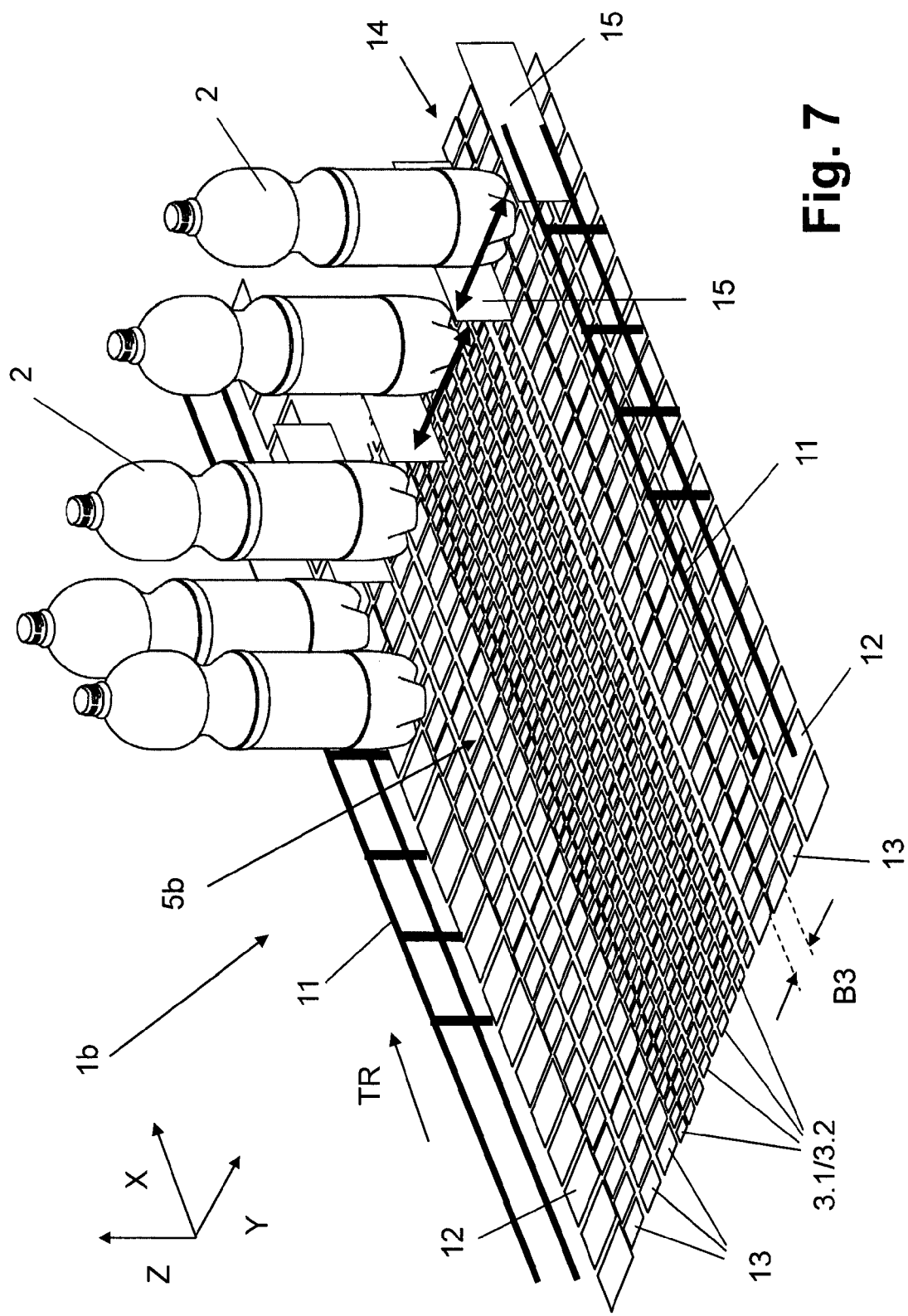
FIGS. 7 and 8 show, in a perspective partial view, a further embodiment of the conveyor according to the invention in an operating state for conveying bottles having a relatively large standing-bottom diameter (FIG. 7) or having a relatively small standing-bottom diameter.
Figure 8:
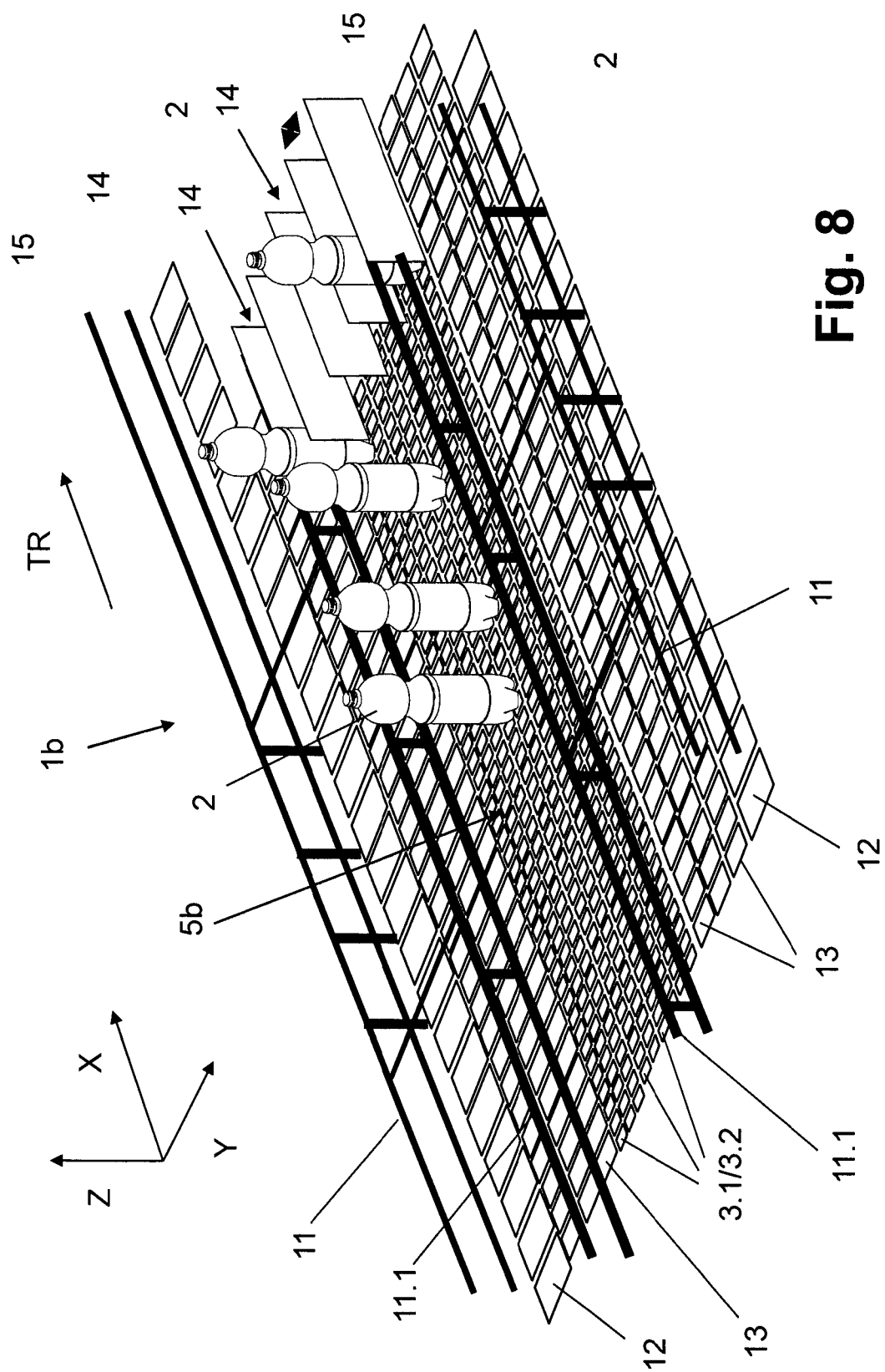

FIGS. 7 and 8 show a conveyor 1b, the conveying surface 5b of which, which is horizontal or substantially horizontal, i.e. arranged in the XY plane, is once again formed by a plurality of conveyor belts of different width, namely by the conveyor belts 3.1/3.2 of the first type having the width B1, which (conveyor belts) form a middle region of the conveying surface 5b, by outer conveyor belts 12 of the second type having the width B2, which (conveyor belts) form the edge region of the conveying surface 5b in each case immediately next to the lateral container guides 11, and by conveyor belts 13 of a third type, the width B3 of which is larger than the width B1 but smaller than the width B2 and which are in each case provided between the middle region and an edge region of the conveying surface 5a.

In detail, the arrangement of the conveyor belts in the embodiment shown in FIGS. 7 and 8 is selected in such a way that, in an axial direction parallel to the Y axis, i.e. perpendicular to the conveying direction TR, proceeding from a longitudinal side of the conveying surface 5b, an outer conveyor belt 12 is followed by three conveyor belts 13, then by ten conveyor belts 3.1/3.2, then by three conveyor belts 13 and then by a conveyor belt 12 immediately adjacent to the lateral container guide 11. All the conveyor belts 3.1, 3.2, 12 and 13 once again form in each case a closed loop which can be driven in rotation and the upper loop length of which forms part of the conveying surface 5b. Furthermore, all the conveyor belts 3.1/3.2, 12 and 13 are once again preferably conveyor chains or slat-band chains. At least with regard to the number and type of the conveyor belts 3.1/3.2, 12 and 13, the conveying surface 5b is once again mirror-symmetrical relative to a central plane arranged in the XZ plane.

As shown in FIGS. 7 and 8, the conveyor 1b is particularly suitable for conveying in the conveying direction TR bottles 2 or other containers having very different container diameters or standing-bottom diameters SD and for guiding these in lanes 14 in which the bottles 2 or containers then form in each case a single-file stream of bottles or containers and are fed to a proceeding machine as parallel, single-file streams of bottles or containers, for example to a cleaning machine for cleaning the bottles 2 or to a packer for inserting the bottles 2 into transportation aids, e.g. into transport crates or bottle crates or into transport boxes, etc.

When processing the larger bottles 2, i.e. the bottles 2 having the larger or largest standing-bottom diameter SD, which are for example the bottles having the largest standing-bottom diameter SD to be processed by the conveyor 1b, as shown in FIG. 7 the entire width or almost the entire width of the conveyor 1b or of the conveying surface 5b is used for feeding the bottles 2. The lanes 14, the width of which is adapted to the diameter of the bottles 2, i.e. is slightly larger than this diameter, are each delimited laterally and also separated from each other by guide elements 15, for example by guide elements in the form of separating plates or guide plates. The guide elements 15 extend in the conveying direction TR and are therefore arranged with their surfaces in the XZ plane. The two outer lanes 14 are delimited on the outside by the outer guide elements 15, which in the mode of operation shown in FIG. 7 form the continuation of the lateral container guides 11.

As shown in FIG. 7, the conveying surfaces in the lanes 14 are each formed by different conveyor belts 3.1/3.2, 12 and 13. Due to the large standing-bottom diameter SD of the bottles 2, reliable conveying of these bottles 2 also within the lanes 14 is ensured.

FIG. 8 shows the conveyor 1a together with bottles 2 which, compared to the bottles in FIG. 7, have a greatly reduced bottle size and a reduced standing-bottom diameter SD and are for example bottles having the smallest standing-bottom diameter SD to be processed by the conveyor 1b. In the case of these bottles 2, only the middle region of the conveying surface 5b, formed exclusively by the conveyor belts 3.1 and 3.2, is used for conveying purposes and for forming the lanes. To this end, the two outer container guides 11 are each moved towards the middle of the conveying surface 5b until they laterally delimit the middle region of the conveying surface 5b which is formed exclusively by the conveyor belts 3.1/3.2, as indicated by 11.1 in FIG. 8. In principle it is also possible to provide further container guides 11.1 in addition to the outer container guides 11. The individual lanes 14, the width of which is once again adapted to the diameter of the bottles 2, are each delimited on both sides by a guide element 15, wherein the outer guide elements 15 form the continuation of the container guide 11.1. The conveying surface in each lane 14 is formed exclusively by the narrower conveyor belts 3.1/3.2 having the width B1.

The width B1 of the conveyor belts 3.1/3.2 once again corresponds for example to the width B which these conveyor belts exhibit in the case of the conveyor 1. Preferably, the width B1 is selected in such a way that it corresponds to approximately one-fifth of the standing-bottom diameter SD of the smallest bottles 2 or containers to be processed by the conveyor 1b. In order to be able to process with the conveyor 1b also bottles 2 or other containers having a bottle size or container size and/or standing-bottom diameter SD which lies between the bottle sizes or container sizes and/or standing-bottom diameters of FIGS. 7 and 8, the width B3 of the conveyor belts 13 is preferably selected in such a way that the width B3 corresponds to approximately one-fifth of the standing-bottom diameter SD of the second-smallest bottles 2 or containers to be processed by the conveyor 1b.

One significant advantage of the conveyor 1b once again lies in the fact that bottles 2 or containers having very different bottle sizes or container sizes and/or having very different standing-bottom diameters SD can be reliably conveyed by this conveyor, namely with reduced manufacturing costs for the conveyor 1b, in particular due to minimising the number of conveyor belts 3.1/3.2, 12 and 13 that are required.

The conveyor belts 3.1, 3.2, 12 and 13 are driven for example at the same conveying speed or at different conveying speeds, preferably the conveyor belts 3.1, 3.2, 12, 13 forming a container inlet and/or a container outlet of the conveying device 1, 1a or 1b at different conveying speeds and/or at a conveying speed different from the conveying speed of the other conveyor belts 3.1, 3.2, 12, 13.

The invention has been described above on the basis of examples of embodiments. It will be understood that numerous changes and modifications will be possible without thereby departing from the inventive concept on which the invention is based.

LIST OF REFERENCES 1, 1a, 1b conveyor
2 bottle
2.1 bottle bottom
2.1.1 sub-region of the bottle bottom 1
3.1, 3.2 conveyor belt
4 direction change wheel or chain wheel
5, 5a, 5b conveying surface
6 sliding guide
7 machine frame
8 transition
9 gap
10 sliding plate or sliding element
11 lateral container guide
12, 13 conveyor belt
14 lane
15 guide element
A adjustment of the lateral container guide 11
B width of the conveyor belts
FA container axis or bottle axis
SD standing-bottom diameter
TR conveying direction
X, Y, Z spatial axis

The invention claimed is:

1. An apparatus comprising a conveying device for conveying containers in a conveying direction, said containers having container bottoms, each of which has a cross-section characterized by, in the case of a container having a circular cross-section, a standing-bottom diameter, and in the case of a container having a non-circular cross section, a smaller standing-bottom diameter and a larger standing-bottom diameter, said conveying device comprising a plurality of conveyor belts of a first type extending along said conveying direction between a front end and a rear end, said conveyor belts being guided over a direction-changing element at said front end and being guided over a direction-changing element at said rear end, thereby forming a closed loop, wherein said conveyor belts form, with upper-loop lengths thereof, a sub-region of a conveying surface, said upper-loop lengths being disposed adjacent to each other in a plurality of rows offset from each other in an axial direction perpendicular to said conveying direction, wherein said containers stand on said upper-loop lengths on said container bottoms, wherein said conveyor belts have a width in said axial direction, wherein, in the case of a container having a circular cross-section, said width is smaller than half the standing-bottom diameter of the smallest container diameter to be conveyed by said conveying device, and wherein, in the case of a container having a non-circular cross-section, said width is smaller than half a smaller standing-bottom diameter of a smallest container diameter to be conveyed by said conveying device, wherein at least a sub-region of said conveying surface is formed by at least one conveyor belt of a first type, at least one conveyor belt of a second type, and at least one conveyor belt of a third type, wherein said at least one conveyor belt of a third type has a width that is larger than a width of said at least one conveyor belt of a first type and smaller than a width of said at least one conveyor belt of a second type.

2. The apparatus of claim 1, wherein each row from said plurality of rows comprises at least two conveyor belts that succeed one another in said conveying direction at a transition, wherein, in the case of a container having a circular cross-section, transitions on said conveying surface are offset from each other in such a way that a distance between said transitions is at least equal to half a standing-bottom diameter of a largest container diameter to be conveyed by said conveying device, and wherein, in the case of a container having a non-circular cross-section, said transitions are offset from each other in such a way that a distance between transitions is greater than half a larger standing-bottom diameter of a largest container diameter to be conveyed by said conveying device.

3. The apparatus of claim 1, wherein a width of said conveyor belts is selected from the group consisting of at least 10 mm, at most 25 mm, 15 mm, 20 mm, and 25 mm, a whole-number fraction of 85 mm, 42.5 mm, 28.3 mm, 21.2 mm, 17.0 mm, 14.1 mm, and 12.14 mm.

4. The apparatus of claim 1, wherein a width of said at least one conveyor belt of a second type, in the case of a container having a circular cross-section, is equal to said standing-bottom diameter or, wherein said width of said at least one conveyor belt of a second type, in the case of a container having a non-circular cross-section, is equal to said smaller standing-bottom diameter of in each case said containers to be conveyed by said conveying device which have a largest container diameter or standing-bottom diameter, and/or wherein said width of said at least one conveyor belt of a third type, in the case of container having a circular cross-section, is equal to one-fifth of said standing-bottom diameter or, in the case of a container having a non-circular cross section, said width of said at least one conveyor belt of said third type is between one-fifth and two-fifths of said smaller standing-bottom diameter of containers to be conveyed by said conveying device that have the second-smallest container diameter or standing-bottom diameter.

5. The apparatus of claim 1, wherein said at least one conveyor belt of said second type has a width of selected from the group consisting of a width between 40 and 125 mm, and 85 mm.

6. The apparatus of claim 1, wherein said conveyor belts form at least one of a container inlet and a container outlet of said conveying device at different conveying speeds and/or at a conveying speed different from a conveying speed of other conveyor belts.

7. The apparatus of claim 1, wherein said conveying surface in at least one sub-region of said conveyor is formed, starting from a longitudinal side of said conveyor or of said conveying surface, by at least one conveyor belt of a second type, then by at least two conveyor belts of a third type, and then by a plurality of conveyor belts of said first type.

8. The apparatus of claim 7, wherein a number of conveyor belts of said first type that are offset from each other in said axial direction is selected in such a way that a conveying width of said sub-region of said conveying surface formed by said conveyor belts is equal to a whole-number multiple of a container diameter of a smallest container to be conveyed by said conveying device.

9. The apparatus of claim 1, wherein a number and type of conveyor belts in at least one sub-region is mirror-symmetric relative to a central plane oriented in said conveying direction and perpendicular to said conveying surface.

10. An apparatus comprising a conveying device for conveying container in a conveying direction, said containers having container bottoms, each of which has a cross-section characterized by, in the case of a container having a circular-cross section, a standing-bottom diameter, and in the case of a container having a non-circular cross section, a smaller standing-bottom diameter and a larger standing-bottom diameter, said conveying device comprising a plurality of conveyor belts extending along said conveying direction between a front end and a rear end, said conveyor belts being guided over a direction-changing element at said front end and being guided over a direction-changing element at said rear end, thereby forming a closed loop, wherein said conveyor belts form, with upper-loop lengths thereof, a sub-region of a conveying surface, said upper-loop lengths being disposed adjacent to each other in a plurality of rows offset from each other in an axial direction perpendicular to said conveying direction, wherein said containers stand on said upper-loop lengths on said container bottoms thereof, wherein each row comprises at least two conveyor belts that succeed one another in said conveying direction at a transition, wherein a distance between two transitions is one of a distance between said two transitions in said axial direction and a distance between said two transitions in said conveying direction, wherein, in the case of a container having a circular cross-section, said transitions are offset from each other in such a way that said distance is at least equal to half of a standing-bottom diameter of a largest container diameter to be conveyed by said conveying device, and wherein, in the case of a container having a non-circular cross-section, said transitions are offset from each other in such a way that said distance is greater than half of a larger standing-bottom diameter of a largest container diameter to be conveyed by said conveying device, wherein said conveyor belts have a width in said axial direction, and wherein, in the case of a container that has a circular cross-section, there exists a container that has the smallest standing-bottom diameter of all such containers to be conveyed, and wherein said width is smaller than half said standing-bottom diameter, and in the case of a container that has a non-circular cross-section there exists a container that has the smallest smaller standing-bottom diameter of all such containers to be conveyed, and said width is smaller than half of said smallest smaller standing-bottom diameter, wherein said width of said conveyor belts is smaller than a fraction of a value selected from the group consisting of said standing-bottom diameter of a smallest container to be conveyed by said conveying device and said smallest smaller standing-bottom diameter of a smallest container to be conveyed by said conveying device, wherein said fraction is one-quarter.

11. The apparatus of claim 10, wherein said transitions at least of adjacent rows are offset from each other in said axial direction.

12. The apparatus of claim 10, wherein a distance between a transition and another transition adjacent thereto is between 30 mm and 60 mm.

13. The apparatus of claim 10, wherein a distance between each transition and each further transition in said conveying direction and/or in said axial direction is at least equal to one of one-quarter of a standing-bottom diameter of containers to be conveyed by said conveying device that have a largest standing-bottom diameter, and one-quarter of a larger standing-bottom diameter of containers to be conveyed by said conveying device that have a largest larger standing-bottom diameter.

14. The apparatus of claim 10, wherein said transitions are offset in one of a first axial direction and a second axial direction in such a way that each container, when passing a transition, always stands with at least half of at least one of a standing bottom thereof and a standing-bottom diameter thereof outside said transition on said conveying surface formed by said conveyor belts.

15. An apparatus comprising a conveying device for conveying containers in a conveying direction, said containers having container bottoms, each of which has a cross-section characterized by, in the case of a container having a circular cross-section, a standing-bottom diameter, and in the case of a container having a non-circular cross section, a smaller standing-bottom diameter and a larger standing-bottom diameter, said conveying device comprising a plurality of conveyor belts of a first type extending along said conveying direction between a front end and a rear end, said conveyor belts being guided over a direction-changing element at said front end and being guided over a direction-changing element at said rear end, thereby forming a closed loop, wherein said conveyor belts form, with upper-loop lengths thereof, a sub-region of a conveying surface, said upper-loop lengths being disposed adjacent to each other in a plurality of rows offset from each other in an axial direction perpendicular to said conveying direction, wherein said containers stand on said upper-loop lengths on said container bottoms, wherein said conveyor belts have a width in said axial direction, wherein, in the case of a container having a circular cross-section, said width is smaller than half the standing-bottom diameter of the smallest container diameter to be conveyed by said conveying device, and wherein, in the case of a container having a non-circular cross-section, said width is smaller than half a smaller standing-bottom diameter of a smallest container diameter to be conveyed by said conveying device, wherein said conveying surface in at least one sub-region of said conveyor is formed, starting from a longitudinal side of said conveyor or of said conveying surface, by at least one conveyor belt of a second type, then by at least two conveyor belts of a third type, and then by a plurality of conveyor belts of said first type.

16. The apparatus of claim 15, wherein a number of conveyor belts of said first type that are offset from each other in said axial direction is selected in such a way that a conveying width of said sub-region of said conveying surface formed by said conveyor belts is equal to a whole-number multiple of a container diameter of a smallest container to be conveyed by said conveying device.

* * * * *